United States Patent
Argoitia et al.

(10) Patent No.: US 12,271,011 B2
(45) Date of Patent: Apr. 8, 2025

(54) DIFFRACTIVE PIGMENT INCLUDING AN EMBOSSED LAYER

(71) Applicant: VIAVI SOLUTIONS INC., San Jose, CA (US)

(72) Inventors: Alberto Argoitia, Santa Rosa, CA (US); Kangning Liang, Santa Rosa, CA (US); Johannes P. Seydel, Petaluma, CA (US); Jaroslaw Zieba, Santa Rosa, CA (US)

(73) Assignee: VIAVI SOLUTIONS INC., Chandler, AZ (US)

( * ) Notice: Subject to any disclaimer, the term of this patent is extended or adjusted under 35 U.S.C. 154(b) by 690 days.

(21) Appl. No.: 17/025,824

(22) Filed: Sep. 18, 2020

(65) Prior Publication Data

US 2022/0091313 A1    Mar. 24, 2022

(51) Int. Cl.
| | | |
|---|---|---|
| *G02B 5/18* | (2006.01) | |
| *B05D 5/06* | (2006.01) | |
| *B29D 11/00* | (2006.01) | |
| *C09C 1/00* | (2006.01) | |

(52) U.S. Cl.
CPC ...... *G02B 5/1852* (2013.01); *B29D 11/00769* (2013.01); *B29D 11/00865* (2013.01); *C09C 1/0024* (2013.01); *C09C 1/0048* (2013.01); *C09C 2210/40* (2013.01); *G02B 2207/101* (2013.01)

(58) Field of Classification Search
CPC .......... G02B 1/002; G02B 1/005; G02B 1/04; G02B 5/18; Y10T 428/24942; Y10T 428/2991; Y10T 428/2998; B05D 5/06; B29D 11/00769; B29D 11/00865; C09C 1/0024–0048
See application file for complete search history.

(56) References Cited

U.S. PATENT DOCUMENTS

| | | | |
|---|---|---|---|
| 6,790,387 B1 * | 9/2004 | Ball | B21B 1/227 72/379.6 |
| 7,821,691 B2 | 10/2010 | Walter et al. | |
| 10,928,579 B2 | 2/2021 | Seydel et al. | |
| 11,214,689 B2 | 1/2022 | Seydel et al. | |
| 2003/0190473 A1 * | 10/2003 | Argoitia | G02B 5/1861 428/402 |

(Continued)

FOREIGN PATENT DOCUMENTS

| | | |
|---|---|---|
| CN | 1656180 A | 8/2005 |
| CN | 101636276 A | 1/2010 |

(Continued)

OTHER PUBLICATIONS

Shenglong Chang, "Course Preparation and Teaching for Physics Teachers", p. 86, People's Education Press, Dec. 31, 2015 with machine English translation.

*Primary Examiner* — HOA (Holly) Le
(74) *Attorney, Agent, or Firm* — Mannava & Kang, P.C.

(57) ABSTRACT

A diffractive pigment includes diffractive pigment, includes a stack including alternating layers of a high refractive index layer and a low refractive index layer, in which the high refractive index layer is a composition including an organic material and high refractive index inorganic nanoparticles; in which at least one layer of the stack is embossed. A method of making a diffractive pigment is also disclosed.

20 Claims, 6 Drawing Sheets

(56) References Cited

U.S. PATENT DOCUMENTS

| | | | |
|---|---|---|---|
| 2003/0224164 A1* | 12/2003 | Argoitia | C09D 5/36 |
| | | | 428/402 |
| 2004/0151827 A1 | 8/2004 | Argoitia et al. | |
| 2006/0263539 A1* | 11/2006 | Argoitia | C09D 11/037 |
| | | | 427/532 |
| 2008/0024866 A1 | 1/2008 | Walter et al. | |
| 2010/0298469 A1 | 11/2010 | Kaupp et al. | |
| 2016/0075165 A1* | 3/2016 | Machizaud | B42D 25/36 |
| | | | 428/347 |
| 2016/0168177 A1 | 6/2016 | Cunningham et al. | |
| 2017/0368798 A1 | 12/2017 | Seydel et al. | |
| 2017/0368866 A1 | 12/2017 | Seydel et al. | |
| 2018/0171151 A1* | 6/2018 | Argoitia | C09C 1/66 |
| 2020/0142128 A1* | 5/2020 | Baer | G02B 6/1225 |
| 2020/0215571 A1* | 7/2020 | Argoitia | B42D 25/45 |
| 2021/0141144 A1 | 5/2021 | Seydel et al. | |
| 2022/0003905 A1* | 1/2022 | Kuna | G02B 1/115 |
| 2022/0089878 A1 | 3/2022 | Seydel et al. | |

FOREIGN PATENT DOCUMENTS

| | | |
|---|---|---|
| CN | 103102728 A | 5/2013 |
| CN | 107710035 A | 2/2018 |
| EP | 3269779 A1 | 1/2018 |
| GB | 2339785 | 2/2000 |
| WO | 2007137438 | 12/2007 |
| WO | 2020/146256 A2 | 7/2020 |

* cited by examiner

DIFFRACTIVE PIGMENT INCLUDING AN EMBOSSED LAYER

FIELD OF THE INVENTION

The present disclosure generally relates to a diffractive pigment including a stack including alternating layers of a high refractive index layer and a low refractive index layer, wherein the high refractive index layer is a composition including an organic material and high refractive index inorganic nanoparticles; wherein at least one layer of the stack is embossed. Methods of making the diffractive pigment are also disclosed.

BACKGROUND OF THE INVENTION

Many products can be made on a substrate with a release layer, such as sodium chloride. The release layer is evaporated under vacuum prior to coating. Additionally, a multilayer design to make flakes is deposited under vacuum on microstructured substrate foils. Once coated, the multilayer design is stripped off in a wet process that dissolves the release layer using a mixture of acetone and water. The stripped flakes are dried, then milled by grinding to obtain a final desired particle size distribution. Non-limiting examples of dry or wet grinding techniques include jet mill, cryogenic, ultrasonic on liquid media, Rotor-Stator mill wet grinding, etc. The described processes require a large number of steps to be performed by different equipment resulting in increased manufacturing costs and making the end product, a pigment, expensive.

Additionally, embossed multilayer designs can include aluminum as a reflector layer. However, the use of aluminum is a liability and prevents the ability to make a semi-transparent multilayer design.

Other multilayer designs included stacks of all dielectric materials, such as dielectric inorganic materials, formed using standard thin film vacuum deposition processes. The thin film deposition processes limited the types of materials that could be used to create the multilayer designs and thereby limited the optical effects achieved. For example, the layers of the stacks included only inorganic materials. With regard to the optical effects, the materials used and the vacuum deposition processes limited the manner and variety in which the multilayer designs could be embossed thereby limiting the variety in diffractive interfaces possible.

What is needed is an article that can be prepared in a process utilizing fewer pieces of equipment resulting in lower manufacturing costs.

SUMMARY OF THE INVENTION

In an aspect, there is disclosed a diffractive pigment including a stack including alternating layers of a high refractive index layer and a low refractive index layer, wherein the high refractive index layer is a composition including an organic material and high refractive index inorganic nanoparticles; wherein at least one layer of the stack is embossed.

In a further aspect, there is disclosed a method of making a diffractive pigment, including depositing alternating layers of a high refractive index layer and a low refractive index layer to form a stack; and embossing at least one layer of the stack; wherein the high refractive index layer is a composition including an organic material and high refractive index inorganic nanoparticles.

Additional features and advantages of various embodiments will be set forth, in part, in the description that follows, and will, in part, be apparent from the description, or can be learned by the practice of various embodiments. The objectives and other advantages of various embodiments will be realized and attained by means of the elements and combinations particularly pointed out in the description herein.

BRIEF DESCRIPTION OF THE DRAWINGS

The present disclosure in its several aspects and embodiments can be more fully understood from the detailed description and the accompanying drawings, wherein.

Throughout this specification and figures like reference numbers identify like elements.

DETAILED DESCRIPTION OF THE INVENTION

It is to be understood that both the foregoing general description and the following detailed description are exemplary and explanatory only, and are intended to provide an explanation of various embodiments of the present teachings. References herein to the "top", "bottom", "middle", etc. are used for ease of reference relating to a position of an item relative to another and are not intended to be limiting.

In its broad and varied embodiments, disclosed herein is a diffractive pigment; and a method of making the diffractive pigment. The diffractive pigment 10 can include a stack including alternating layers of a high refractive index layer and a low refractive index layer, wherein the high refractive index layer is a composition including an organic material and high refractive index inorganic nanoparticles; wherein at least one layer of the stack is embossed. The diffractive pigment can include including a stack including alternating layers, in which at least one layer, up to and including all of the layers, has been embossed. The diffractive pigment 10 can be transparent or semi-transparent. The diffractive pigment 10 can include transparent or semi-transparent materials, such as organic materials, and organic or inorganic nanoparticles. In an aspect, the diffractive pigment can be made by depositing the multiple alternating layers on a substrate including a release layer, followed by embossing the entire structure, i.e., the substrate, release layer, and stack of multiple alternating layers.

As used herein, a high refractive index (HRI) layer 12 has an index of refraction greater than or equal to about 1.65, and for example greater than about 1.8, and low refractive index (LRI) layer 14 has an index of refraction less than about 1.65. It is not necessary that each HRI layer 12 be made of the same high-index material, or that each LRI layer 14 be made of the same low-index material, and materials may be graded or mixed within a layer.

Figure 1A:
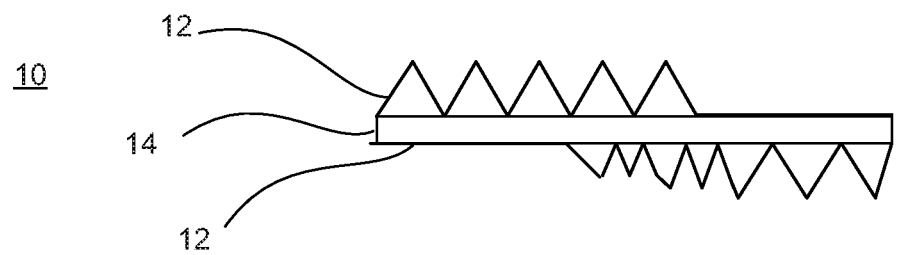
FIG. 1A is a cross-section of a diffractive pigment including a first high refractive index layer, a low refractive index layer, and a second high refractive index layer, according to an aspect of the present disclosure.

As shown in FIG. 1A, the diffractive pigment 10 can include a stack including alternating layers of a high refractive index (HRI) layer 12, and a low refractive index (LRI) layer 14, wherein the high refractive index layer 12 is a composition including an organic material and high refractive index inorganic nanoparticles; wherein at least one layer of the stack is embossed. The stack can include two or more layers, such as 3 alternating layers, for example, 5 alternating layers, and, as a further example, 7 alternating layers. The diffractive pigment 10 can include a stack with an even number of alternating layers. The diffractive pigment 10 can include a stack with an odd number of alternating layers. The individual layers of the diffractive pigment 10 are disclosed more fully below.

In an aspect, the diffractive pigment 10 does not include a layer of metal, such as a reflector layer or an absorber layer. For example, the diffractive pigment 10 does not include a layer with materials having reflective properties. In particular, the diffractive pigment 10 does not include aluminum. Because a metallic layer is not present, the diffractive pigment 10 can be transparent or semi-transparent. The diffractive pigment 10 can provide reflection of incident light by compounding the reflection from all of the interfaces of the layers, and the reflectance back from a substrate to the deposited diffractive pigment 10.

The stack including alternating layers can be embossed to varying degrees so long as at least one layer of the stack is embossed. A layer of the stack can be fully embossed or partially embossed. By partially embossed is understood to mean embossing a portion of the layer, such as along a dimension of the layer and/or with regard to a surface (e.g., top, bottom) of the layer with the remaining portion of the layer non-embossed, e.g. smooth. As an alternative, a layer of the stack can be fully embossed. It is understood that "partially" means greater than 0 but less than 100%. It is understood that "fully" means equal to 100%. The diffractive pigment 10 has at least one layer of the stack that can be embossed, such as partially embossed or fully embossed. The diffractive pigment 10 can have another layer of the stack of alternating layers in which the another layer is non-embossed. To be clear, each layer can be independently fully embossed, partially embossed, or non-embossed so long as at least one layer of the stack is embossed.

FIG. 1A illustrates a diffractive pigment 10 including a stack of alternating layers 12, 14. A top HRI layer 12 is partially embossed along a length of the layer and partially non-embossed along a remainder of the length of the layer. A middle LRI layer 14 is fully non-embossed. A bottom HRI layer 12 is partially embossed along a length of the layer and partially non-embossed along a remainder of the length of the layer. The diffractive pigment 10 has terminal areas in which there is a single layer of the stack with embossing, and a central area in which there are multiple layers with embossing. It is noted that LRI layer 14 could be similarly fully or partially embossed.

Figure 1B:
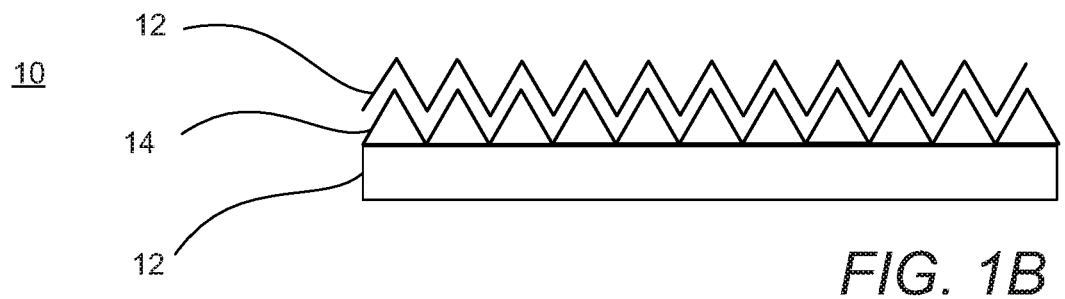
FIGS. 1B-1E illustrate diffractive pigments with varying degrees of embossing.

FIG. 1B illustrates a diffractive pigment 10 in which at least one layer of the stack is embossed. A top HRI layer 12 is fully embossed along a length of the layer, but also along the two opposing surfaces, e.g., top and bottom, of the layer 12. A middle LRI layer 14 is fully embossed along a top surface and is fully non-embossed along a bottom surface. A bottom HRI layer 12 is fully non-embossed on both its top and bottom surfaces. It is noted that the embossing of the top HRI layer 12 and the embossing of the top surface of middle LRI layer 14 conform to one another.

In a further aspect, one or more surfaces of one or more layers of the stack can be embossed, e.g., partially or fully. For example, a top surface of a layer can be embossed and a bottom surface of the layer can be embossed or non-embossed. In this manner, the single layer can have a thickness such that the embossing is present on one surface of the layer. The layer can be embossed on opposing surfaces of the layer. Additionally, and/or alternatively, one or more surfaces of one or more layers of the stack can be non-embossed. A non-embossed surface and/or layer can be smooth, such as planar, for example, due to self-leveling.

Figure 1C:
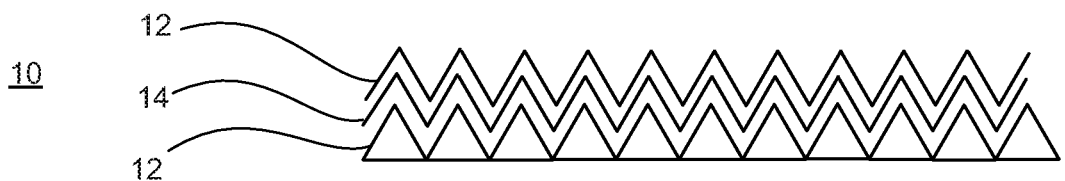

In an aspect, a majority of the alternating layers of the stack are embossed, such as partially or fully embossed, as illustrated in FIG. 1C. It is understood that "majority" means greater than or equal to 50% of the layers of the alternating layers of the stack. In FIG. 1C, the diffractive pigment 10 can include a stack of alternating layers of HRI layer 12 and LRI 14. The top HRI layer 12 and the middle LRI layer 14 are fully embossed. The bottom HRI layer 12 has a top surface that is fully embossed and a bottom surface that is fully non-embossed.

Figure 1D:

As shown in FIG. 1D, the diffractive pigment 10 can include a stack of alternating layers of HRI layer 12 and LRI layer 14 that are each independently fully embossed.

In another aspect, the stack of alternating layers can include a core layer, e.g., one or ore central layers, that are non-embossed, and outer layers, e.g., one or more layers, that are at least partially embossed or fully embossed along a surface and/or a length of the outer layers. So, for example, in a stack of HLH, the core layer can be a LRI layer 14 that can be non-embossed, and the other layers can be a HRI layer 12 that can be embossed. Similarly, in a stack of HLHLHLH, the core layer can be a LRI layer 14 that can be non-embossed, the two HRI layers 12 on opposing sides of the LRI layer 14 can be at least partially embossed, and the remaining LH on can be at least partially embossed, e.g., fully embossed.

In an aspect, the diffractive pigment 10 can be embossed with a pattern on the stack and/or on each alternating layer of the stack. In an aspect, the at least one layer of the stack that is embossed can include a pattern chosen from sinusoidal, triangular, square, blazed, ruled gratings in a linear, cross, hexagonal, circular configuration, and any combination of them.

The embossing can include a frequency that can be uniform within the stack and/or within each alternating layer of the stack. As an example, the top HRI layer 12 of FIG. 1B includes a uniform frequency across a length or a surface of the layer. The embossing can include a frequency that can be variable within the stack and/or within each alternating layer of the stack. For example, the bottom HRI layer 12 of FIG. 1A includes a variable frequency, such as a change in depth (modulation) or width (period) of the embossing across a length or a surface of the layer. The frequency affects the spatial position of the diffractive light. The modulation can affect the intensity of a particular diffractive wavelength but not the spatial position of the diffracted light. Therefore, a modulation on one side of a layer/stack can be compensated by a deeper modulation on the other side of the layer/stack, as shown in FIG. 1A. The spatial position of diffractive light can be altered by using different frequencies on each surface of the layer/stack. In this case, the diffractive pigment 10 can appear to be a blend of diffractive pigment of different single frequencies.

Figure 1E:
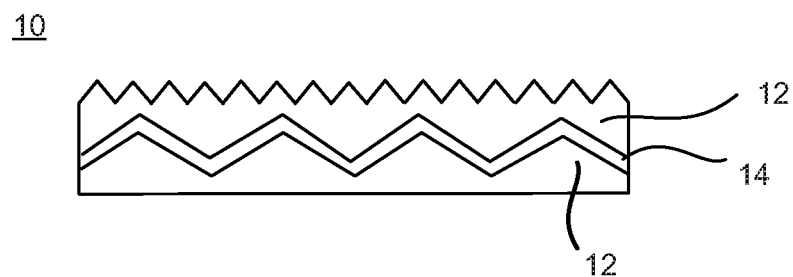

As shown in FIG. 1E, the diffractive pigment can have a portion of the alternating layers can have a frequency different from another portion of the alternating layers. In another aspect, a portion of the alternating layers can have a same frequency but a different modulation. The bottom HRI layer 12, has a bottom external surface that is non-embossed, and a top interior surface that is fully embossed across a length of the top surface of the layer. The LRI layer 14 has top and bottom surfaces that are fully embossed and conform to the embossing of the top interior surface of the bottom HRI layer 12. In an aspect, the LRI layer 14 can be deposited using chemical vapor deposition or physical vapor deposition. For example, the LRI 12 layer has a same frequency and modulation as the bottom HRI layer 12. The top HRI layer 12 has a bottom interior surface that is fully embossed and conforms to the embossing of the LRI layer 14. The top exterior surface of the top HRI layer 12 is also fully embossed but has a different frequency and modulation as compared to other layers in the stack of alternating layers.

As discussed above, the diffractive pigment 10 includes a stack of alternating layers of a high refractive index layer 12 and a low refractive index layer 14. The stack can include more than one HRI layer 12. The stack can include more than one LRI layer 14. If more than one HRI layer is present, the material that forms each HRI layer 12 can the same or different. If more than one LRI layer 14 is present, the material that forms each LRI layer 14 can the same or different.

Figure 2:
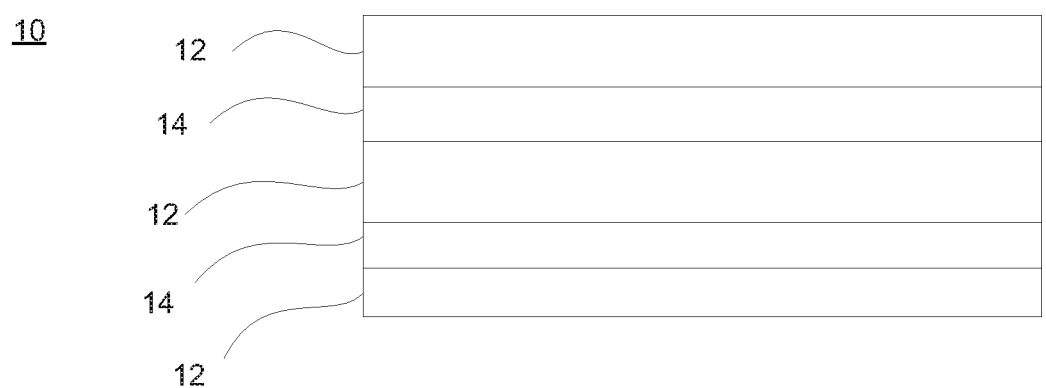
FIG. 2 is a cross-section of a diffractive pigment (shown without embossing), according to an aspect of the present disclosure.

FIGS. 1A-1E illustrate various diffractive pigments 10 with a stack of three alternating layers. It should be noted that the depicted diffractive pigments 10 can also include additional layers in the stack. For example, FIG. 2 illustrates a stack of five alternating layers, in which the embossing is not illustrated to simplify the drawing. As discussed herein, the stack can include any number of alternating layers of HRI layers 12 and LRI layers 14. Although the present FIGs. illustrate the top and bottom layers of the stack as HRI layers 12, the stack can have top and bottom layers as LRI layers 14. Additionally, and/or alternatively, the stack can have a different top and bottom layers, such as a top HRI layer 12 and a bottom LRI layer 14, and vice versa. Additionally, and/or alternatively, the HRI and/or LRI can have the same optical thickness or different optical thicknesses. It is also intended that the diffractive pigment 10 can be embossed in any manner illustrated in FIGS. 1A-1E, and/or as discussed herein.

The high refractive index layer 12 and the low refractive index layer 14 can be the same or different. For example, high refractive index layer 12 and the low refractive index layer 14 can be the same color or can be different colors. In an aspect, high refractive index layer 12 and the low refractive index layer 14 can each be clear. The high refractive index layer 12 and the low refractive index layer 14 can include the same or different organic materials.

The high refractive index layer 12 can be a composition including an organic material, an inorganic nanoparticle, and a colorant, such as a dye and a pigment. The high refractive index layer 12 can be a composition including an organic material and high refractive index inorganic nanoparticles. The components of the composition of the HRI layer 12 are described further herein.

The low refractive index layer 14 can be a composition including an organic material, an inorganic nanoparticle, and a colorant, such as a dye and a pigment. The low refractive index layer 14 can be a composition including low refractive index materials, such as low refractive index organic materials and low refractive index inorganic nanoparticles. The components of the composition of the LRI layer 14 are described further herein.

In an aspect, the low refractive index layer 14 consists of an organic material. In an aspect, the low refractive index layer 14 consists of an inorganic material. In an aspect, the low refractive index layer 14 is an organic material and does not include a colorant or an inorganic material. In an aspect, the low refractive index layer 14 is a composition including an organic material and low index refractive inorganic nanoparticles, such as Silica.

The colorant can be a dye or a pigment. Non-limiting examples of dyes include perylene, perinone, quinacridone, quinacridonequinone, anthrapyrimidine, anthraquinone, anthanthrone, benzimidazolone, disazo condensation, azo, quinolones, xanthene, azomethine, quinophthalone, indanthrone, phthalocyanine, triarylcarbonium, dioxazine, aminoanthraquinone, isoindoline, diketopyrrolopyrrole, thioindigo, thiazineindigo, isoindoline, isoindolinone, pyranthrone, isoviolanthrone, miyoshi methane, triarylmethane, and mixtures thereof.

The colorant can be a dye or a pigment. Non-limiting examples of pigments include metal pigments such as Ag, Au, Cu, Fe, Pb, Pd and Pt; metal-oxide pigments such as $Al_2O_3$, $Fe_2O_3$, $Fe_3O_4$, $Cr_2O_3$, CuO, $CU_2O$, $In_2O_3$, $Mn_2O_3$, PbO, PdO, $SnO_2$, $TiO_2$, ZnO and $ZrO_2$; metal halides such as AgCl, AgBr, $AgCl_xBr_{1-x}$ and CuCl; metal carbides such as TiC and $B_4C$; metal nitrides such as BN and TiN; metal arsenides such as $Cd_3As_4$; metal phosphides such as $Cd_3P_2$; metal chalcogenides (sulphides, selenides, tellurides) such as AgS, CdS, HgS, PbS, $FeS_2$, MoS and ZnS, CdSe, ZnSe and CdTe; and mixed phases such as $ZnSe/PbS_2$ and $CdS/PbS_2$. A further group of suitable pigments includes non-metal pigments, primarily carbon in the form, for example, of graphite or carbon black; non-metal oxide pigments, such as $SiO_2$; and minerals such as micas, spinels, for example magnetite or copper chromium spinel; heavy spar ($BaSO_4$) or fluorspar ($CaF_2$).

The organic material, for use in the high refractive index layer 12 and/or in the low refractive index layer 14, can include materials with thermoplastic properties, for example, materials with a Tg lower than a heat distortion of a substrate. The organic material can be at least one material chosen from thermoplastics, thermosets, and energy curable materials. Non-limiting examples of the organic material include thermoplastics, such as polyesters, polyolefins, polycarbonates, polyamides, polyimides, polyurethanes, acrylics, acrylates, polyvinylesters, polyethers, polythiols, silicones, fluorocarbons, and various co-polymers thereof; thermosets, such as epoxies, polyurethanes, acrylates, melamine formaldehyde, urea formaldehyde, and phenol formaldehyde; and energy curable materials, such as acrylates, epoxies, vinyls, vinyl esters, styrenes, and silanes. Non-limiting examples of materials with thermoplastic properties include acrylic polymers, polyvinyl chloride, polystyrene, acrylic/nitrocellulose blends, acrylic/epoxy hybrids, styrene/acrylic, polyvinyl acetate, and polyvinyl alcohol.

In an aspect, the organic material can have a Tg value in the range of about 20° C. to about 150° C. In the case that the Tg is too low, the organic material can become too "tacky" and difficult to remove from an embossing master. If the Tg is too high, the temperature required to soften the layer can also compromise the properties of the organic material.

The HRI layer 12 and/or the LRI layer 14 can each independently include inorganic nanoparticles. Inorganic nanoparticles can emit light when bombarded by an external source of radiation, such as an electromagnet or electrons. Non-limiting examples of light emitter nanoparticles include fluorescent nanoparticles and double converter nanoparticles. In another aspect, the inorganic nanoparticles can influence the refractive index of the layer. For example, the inorganic nanoparticles can include $TiO_2$ or ZnS, which create an optical interference that will not change much as a function of the incident and viewing angles.

The inorganic nanoparticles can be present in the composition (HRI 12 and/or LRI 14) in an amount to achieve a desired refractive index. Typical inorganic materials that can be used to increase the refractive index of a layer including the disclosed organic material include, but are not limited to, $TiO_2$, $Ta_2O_5$, ZnO, $CeO_2$, $ZrO_2$. An inorganic material that can be used to decrease the refractive index of a layer including the disclosed organic material can be $SiO_2$. Most of the organic materials have a refractive index around 1.5. So, in order to have a thin high refractive index layer with a refractive index greater than about 1.65 the composition of the high refractive index layer can include organic materials and inorganic nanoparticles. The composition can include a high concentration of inorganic nanoparticles, for example, in which the inorganic nanoparticles can have a high refractive index, such as $TiO_2$. As another example, the composition can include an organic material and inorganic nanoparticles, for example, Alumina in order to achieve a low refractive index layer with a refractive index of less than about 1.65.

The inorganic nanoparticles can be present in the composition (HRI 12 and/or LRI 14) in an amount ranging from about 5% to about 99%, for example, from about 25% to about 90%, and as a further example, from about 50% to about 85%, by weight relative to the total weight of the composition. If the composition is for a HRI layer 12, then a higher percentage, e.g., greater than about 50% of inorganic nanoparticles can be used. If the composition is for a LRI layer 14, then a lower percentage can be used, e.g., from about 0.05% to about 30%.

In an aspect, the high refractive index layer 12 and/or the low refractive index layer 14 can each independently be a composition also including a dielectric material, in addition to the other components discussed herein. The dielectric material can influence the thin film interference response of the design by selectively absorbing wavelengths of the incident and reflected light. The dielectric material can be colored and can also be clear.

Non-limiting examples of dielectric materials include $SiO_2$, $TiO_2$, $Al_2O_3$, $ZrO_2$, $WO_3$, $VO_5$, ITO, $Ta_2O_5$, $CeO_2$, $Y_2O_3$, ZnS, ZnO, $In_2O_3$, $La_2O_3$, MgO, $Nd_2O_3$, $Pr_6O_{11}$, $Fe_2O_3$, $Fe_3O_4$, SiO, $SnO_2$, FeOx, $MgF_2$, $AlF_3$, $CeF_3$, $LaF_3$, LiF, $CaF_2$, cermets, diamond-like carbon, and combinations thereof.

FIG. 2 illustrates a diffractive pigment 10 including alternating layers of a high refractive index layer 12 and a low refractive index layer 14. The diffractive pigment 10 does not include a layer of metal, such as a reflector layer and/or an absorber layer. The layers present in the stack can each independently be fully or partially embossed as discussed above, for example, with regard to FIGS. 1A-1E. In this aspect, the high refractive index layer 12 can be a composition including an organic material and inorganic nanoparticles; and the low refractive index layer 14 can be a low refractive index organic material or a composition including an organic material and a low refractive organic or inorganic index nanoparticles.

In an aspect, the HRI layer 12 and the LRI layer 14 can each independently be a selective light modulator layer (SLML).

The SLML can be a composition including a host material alone, or a host material combined with a selective light modulator system (SLMS). The SLMS can include a selective light modulator molecule (SLMM), a selective light modulator particle (SLMP), an additive, or combinations thereof. The previously mentioned dyes can be considered a SLMM and the pigment colorant nanoparticles can be considered as a SLMP.

The host material of the SLML can independently be a film forming material applied as a coating liquid and serving optical and structural purposes. The host material can be used as a host (matrix) for introducing, if necessary, a guest system, such as the selective light modulator system (SLMS), for providing additional light modulator properties to the article.

The host material can be a dielectric material. Additionally, or alternatively, the host material can be at least one of an organic material, and an inorganic polymer, such as those materials discussed above. Non-limiting examples of inorganic polymers includes silanes, siloxanes, titanates, zirconates, aluminates, silicates, phosphazanes, polyborazylenes, and polythiazyls.

The SLMS, for use in the SLML with the host material, can each independently comprise selective light modulator particles (SLMP), selective light modulator molecules (SLMM), additives, or a combination thereof. The SLMS can also comprise other materials.

The SLML can each independently include in an SLMS a SLMP. The SLMP can be any particle combined with the host material to selectively control light modulation, including, but not limited to color shifting particles, dyes (such as a phthalocyanine-based compound), inorganic pigments, organic pigments, reflective pigments, color shifting pigments, quantum dots, selective reflectors, nanoparticles (selectively reflecting and/or absorbing), and micelles, etc. The nanoparticles can include, but are not limited to organic and metalorganic materials having a high value of refractive index (n>1.65 at wavelength of about 550 nm); metal oxides, such as $TiO_2$, $ZrO_2$, $In_2O_3$, $In_2O_3$—SnO, $SnO_2$, $Fe_xO_y$, (wherein x and y are each independently integers greater than 0), and $WO_3$; metal sulfides, such as ZnS, and $Cu_xS_y$, (wherein x and y are each independently integers greater than 0); chalcogenides, quantum dots, metal nanoparticles; carbonates; fluorides; and mixtures thereof.

Figure 4A:
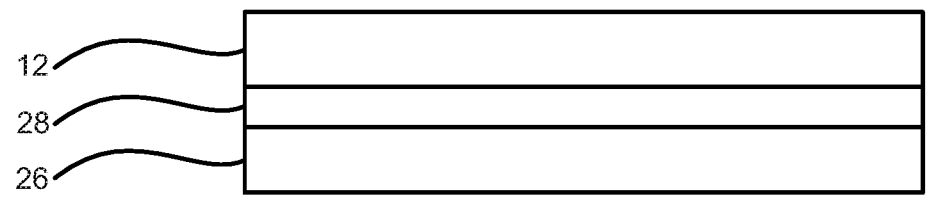
FIGS. 4A-4E illustrate various steps in a method of making a diffractive pigment, according to another aspect of the present disclosure.

The diffractive pigment 10 disclosed herein can be formed using at least two different methods. In an aspect, there is disclosed a method of making a diffractive pigment 10 including depositing alternating layers of high refractive index layer 12 and a low refractive index layer 14 to form a stack; and embossing at least one layer of the stack. As shown in FIG. 4A, a substrate 26 can include a release layer 28. The alternating layers can be deposited on the substrate 26 including the release layer 28. For example, a bottom HRI layer 12 can be coated onto the substrate 26 with release layer 28 using a liquid coating process. The liquid coating process can allow the HRI layer 12 to self-level thereby providing a fully non-embossed layer on opposing surfaces. A LRI layer 14 can be deposited upon the bottom HRI layer 12 using a liquid coating process. The LRI layer can be fully non-embossed across the layer and on opposing surfaces.

The method can further include heating the HRI layer 12 and/or the LRI layer 14 prior to embossing. The deposited layers can be heated to a Tg temperature higher than a Tg of the substrate 26 and release layer 28. In an aspect, the LRI layer 14 can be heated to a Tg temperature higher than a Tg of the HRI 12 that it is deposited on, such as the bottom HRI layer 12.

Figure 3A:
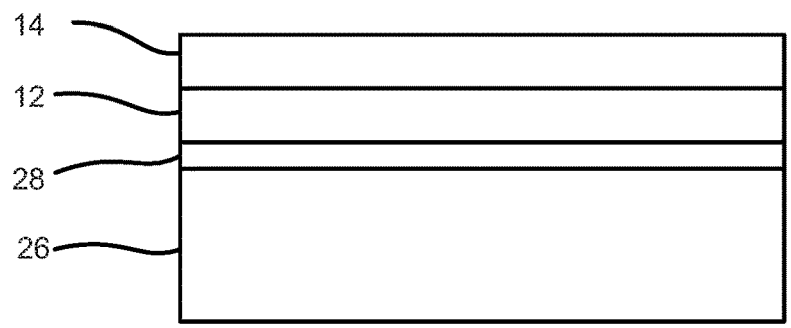
FIGS. 3A-3D illustrate various steps in a method of making a diffractive pigment, according to an aspect of the present disclosure.
Figure 3B:
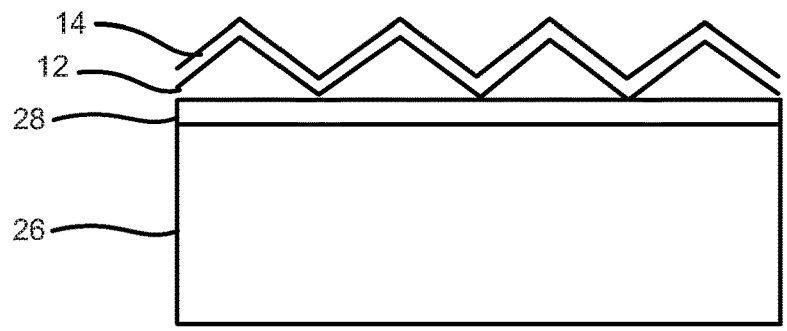

As shown in FIG. 3B, both of the LRI layer 14 and the HRI layer 12, i.e., the stack can be fully embossed. In an Embossing can occur through at least one of temperature and pressure contact with an embossing master. A discontinuous embossing system can be used wherein the substrate/coated layers can be moved by discrete steps under an embossing plate. In this manner, embossing the stack can include partially embossing the stack, and/or partially embossing a layer in the stack, for example, as discussed above with regard to FIGS. 1A-1E. The embossing master can be an embossing roller that is heated to a Tg temperature below the Tg temperature of the layer or layers to be embossed. The bottom HRI layer 12 and the LRI layer 14 can be embossed at the same time to ensure that the embossing of the two layers conforms to one another.

The method can further include embossing the substrate 26 and the releasing layer 28 at the same time as embossing an alternating layer of the stack. For example, the substrate 26 and the releasing layer 28 can be embossed at the same time as the bottom HRI layer 12 is embossed.

Figure 3C:
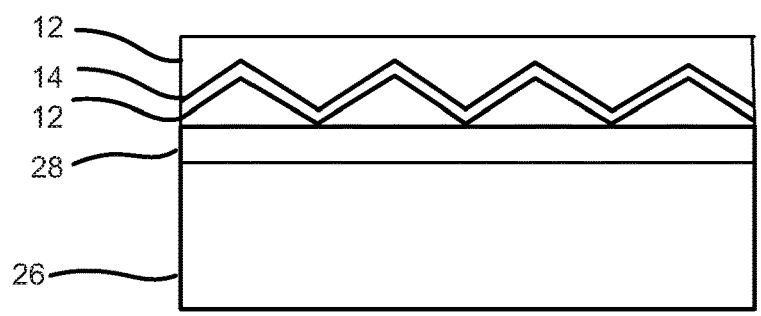

As shown in FIG. 3C, the method can further include depositing a top HRI layer 12 onto the embossed LRI layer 14 and embossed layer 12. The top HRI layer 12 can be deposited using a liquid coating process. The liquid coating process allows the top HRI layer 12 to self-level thereby providing a fully non-embossed top (external) surface and an opposing interior fully embossed surface. This additional layer, i.e., the top HRI layer 12, can be deposited on the embossed alternating layer of the stack so that the at least one additional layer conforms to the embossed alternating layers of the stack.

The layers of the stack can be present in a solvent or water base solution. In this manner, the layers can be coated/applied/deposited using a liquid coating process. Non-limiting example of a liquid coating process include slot-die, gravure, microgravure, inkjet, curtain coating, metering rod, Myer bar coating, flexo, offset printing, slot-bead, slide bead, slot curtain, slide curtain, tensioned web and reverse roll, and other liquid coating and printing processes that apply a liquid onto a substrate or previously deposited layer to form a liquid layer or film that is subsequently dried and/or cured. The liquid coating process can allow for the transfer of the composition of the layer, such as the HRI layer 12, and/or LRI layer 14, at a faster rate as compared to other deposition techniques, such as vapor deposition. Additionally, the liquid coating process can allow for a wider variety of materials to be used in the layer with a simple equipment set up. It is believed that the layer formed using a liquid coating process can exhibit improved optical performance.

Figure 3D:
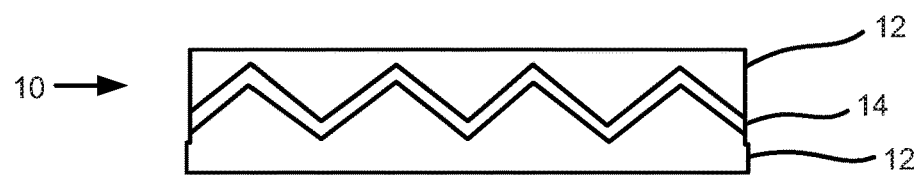

The method can further include releasing the substrate 26 thereby forming a diffractive pigment 10, as shown in FIG. 3D. In an aspect, the substrate 26 can include a release layer 28. The release layer 28 can have a lower adhesion to the first organic layer 12 as compared to the substrate 26. In an aspect, the release layer 28 is water soluble and can be eliminated.

The method can further include applying a chilling drum to the embossed layers (HRI layer 12/LRI layer 14) to remove the heat provided by the embossing roller/plate. Embossing can provide a pattern, such as a hologram, symbols, logos, or any other suitable microstructure to the deposited layers.

The substrate 26 can include a material that is heat resistant, such as a polyester, a polyimide, polyvinyl chloride, or propylene. The substrate 26 can be present in a roll configuration so that the layers of the diffractive pigment 10 are deposited onto the substrate 26 as it moves from an unwind to a rewind roll configuration. The substrate 26 can include a material that has a Tg temperature that is higher than a Tg of the alternating layers, such as the HRI layer 12 and the LRI layer 14. The substrate 26 can be made of a flexible material. The substrate 26 can be any suitable material that can receive multiple layers deposited during the manufacturing process. Non-limiting examples of suitable substrate materials include polymer web, such as polyethylene terephthalate (PET), glass foil, glass sheets, polymeric foils, polymeric sheets, metal foils, metal sheets, ceramic foils, ceramic sheets, ionic liquid, paper, silicon wafers, etc. The substrate can vary in thickness, but can range for example from about 6 µm to about 200 µm, and as a further example from about 10 µm to about 50 µm.

Figure 4B:
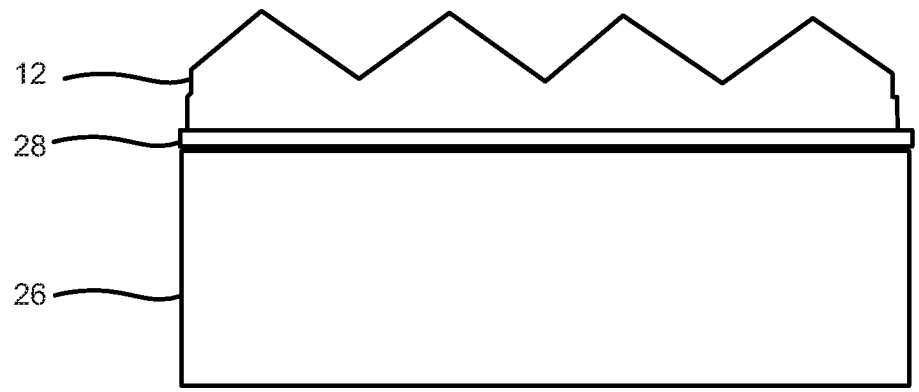
Figure 4C:
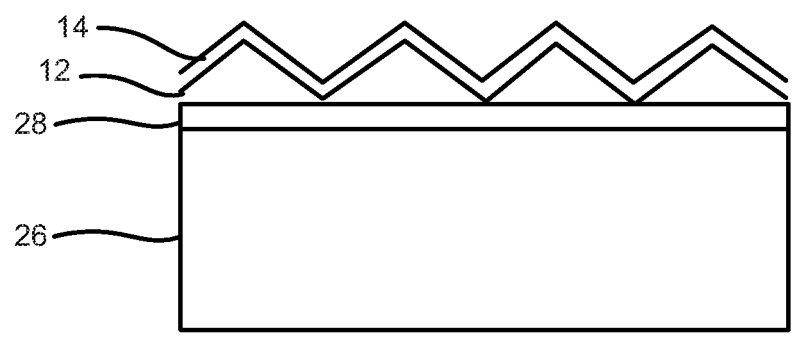

In an aspect, there is also disclosed a method of making a diffractive pigment 10, as shown in FIGS. 4A-4E. The method can include depositing an HRI layer 12 onto a substrate 26, optionally including a release layer 28. The HRI layer 12 can be deposited using a liquid coating process. As shown in FIG. 4B, the method can include embossing the deposited HRI layer 12 to produce a fully embossed top surface and a bottom fully non-embossed surface. The method can include depositing a LRI layer 14 onto the fully embossed top surface of the HRI layer 12. In this manner, the LRI layer 14 conforms to the fully embossed top surface of the embossed HRI layer 12, as shown in FIG. 4C. It should be noted that because the LRI 14 can be deposited using a liquid coating process the LRI layer 14 can conform to surface of the deposited HRI layer 12. For example, if the top surface of the deposited HRI layer 12 was partially embossed, then the LRI layer would likewise be partially embossed and conforming.

Figure 4D:
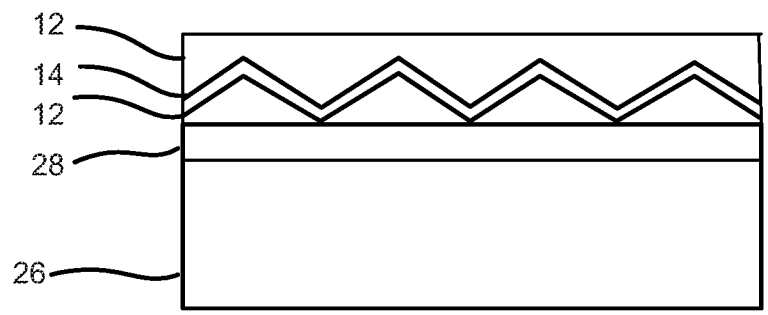

The method can further include depositing a top HRI layer 12 onto the deposited LRI layer 14, as shown in FIG. 4D. The top HRI layer 12 can be coated using a liquid coating process.

Figure 4E:
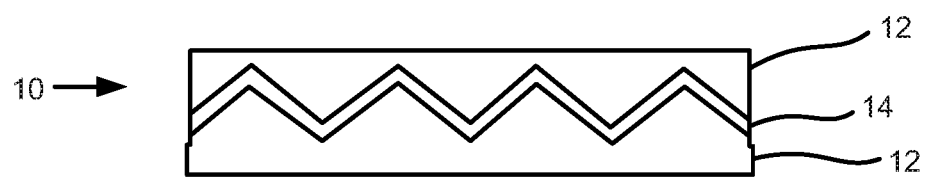

As shown in FIG. 4E, the substrate 26, and the optional release layer can be removed to form the diffractive pigment 10.

Figure 5:
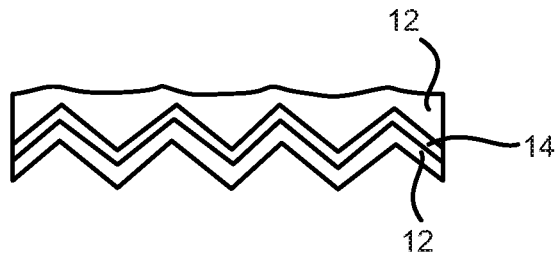
FIG. 5 illustrates a cross-section of diffractive pigment; according to another aspect of the present disclosure.
Figure 6:
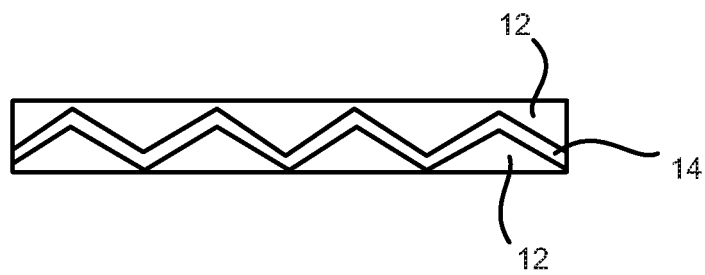
FIG. 6 illustrates a cross-section of a diffractive pigment in which exterior surfaces of exterior layers are non-embossed and every interior surface of every layer is embossed.
Figure 7:
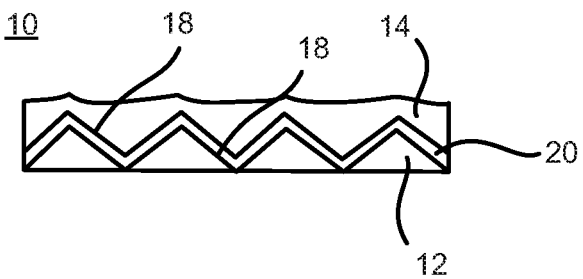
FIG. 7 illustrates a cross-section of a diffractive pigment in which one exterior surface of one exterior layer is non-embossed and planar, another exterior surface of another exterior layer is embossed with a mild modulation that is different from an interior modulation, and every interior surface of every layer is fully embossed with a higher modulation.

In an aspect, the methods can include embossing a first HRI layer 12 followed by deposition of the LRI layer 14 and deposition of the second HRI layer 12. This method can result in the diffractive pigment 10 illustrated in FIG. 5. Alternatively, the method can include depositing the HRI layer 12, depositing the LRI layer 14, embossing both the HRI layer 12 and the LRI layer 14, and depositing the second HRI layer 12. The diffractive pigment 10 has differing modulation of embossing on opposite exterior surfaces. In this manner, the diffractive pigment 10 is asymmetric because the degree of modulation of embossing on opposite exterior surfaces is different. Statistically, 50% of the diffractive pigments 10, such as flakes, having the low modulation embossed HRI layer 12 will lie facing up, and 50% of the diffractive pigments 10 having the higher modulation embossing of the first HRI 12 will lie facing up, providing different intensities of the diffractive effects. FIG. 7 could also be considered asymmetric because the degree of modulation on opposite exterior surfaces is different. FIG. 6 could be considered symmetric.

Additionally, or alternatively, the diffractive pigment 10, in the form of a flake, sheet, or foil, can also include a hard coat or protective layer. In some examples, these layers (hard coat or protective layer) do not require optical qualities.

The alternating layers of the stack can be deposited using a liquid coating process. After a layer is deposited using a liquid coating process, any solvent in the layer is allowed time to evaporate. Additionally, the deposited layer can be subjected to a curing step. In an aspect, embossing of the at least one layer can be done prior to fully curing of a deposited layer of the deposited alternating layers. In this manner, the step of embossing can utilize less pressure and/or temperature as compared to embossing a layer that has been fully cured, and/or a layer that is applied using a vacuum deposition process.

The method can include embossing at least one layer with a grating of a selected frequency and/or modulation. Each successive deposited layer can be embossed with a different frequency and/or modulation to produce an asymmetric diffractive pigment flakes 10, as shown in FIG. 1E.

The step of embossing can include embossing a pattern chosen from sinusoidal, triangular, square, blazed, ruled gratings in a linear, cross, hexagonal, circular configuration, and any combination of them.

Depending on the thermoplastic properties of the diffractive pigment 10 and the release layer 28, an embossing layer can be included between the substrate 26 and the release layer 28. This embossing layer can be part of the diffractive pigment 10. In an aspect, the release layer 28 can be eliminated or introduced between the substrate 26 and the embossable layer.

From the foregoing description, those skilled in the art can appreciate that the present teachings can be implemented in a variety of forms. Therefore, while these teachings have been described in connection with particular embodiments and examples thereof, the true scope of the present teachings should not be so limited. Various changes and modifications can be made without departing from the scope of the teachings herein.

This scope disclosure is to be broadly construed. It is intended that this disclosure disclose equivalents, means, systems and methods to achieve the devices, activities and mechanical actions disclosed herein. For each device, article, method, mean, mechanical element or mechanism disclosed, it is intended that this disclosure also encompass in its disclosure and teaches equivalents, means, systems and methods for practicing the many aspects, mechanisms and devices disclosed herein. Additionally, this disclosure regards a coating and its many aspects, features and elements. Such a device can be dynamic in its use and operation, this disclosure is intended to encompass the equivalents, means, systems and methods of the use of the device and/or optical device of manufacture and its many aspects consistent with the description and spirit of the operations and functions disclosed herein. The claims of this application are likewise to be broadly construed. The description of the inventions herein in their many embodiments is merely exemplary in nature and, thus, variations that do not depart from the gist of the invention are intended to be within the scope of the invention. Such variations are not to be regarded as a departure from the spirit and scope of the invention.

What is claimed is:

1. A method of making a diffractive pigment, comprising:
   depositing alternating layers of a high refractive index layer and a low refractive index layer to form a stack, each layer of the stack including a dielectric material; and
   embossing at least one of the alternating layers to form an embossed surface, wherein a self-planarizing layer of the stack is deposited on the embossed surface using a liquid coating process, the self-planarizing layer having a first surface adjacent the embossed surface and a second surface opposite the embossed surface, the first surface conforming to the embossed surface and the second surface being planar.

2. The method of claim 1, wherein the pigment is transparent or semi-transparent.

3. The method of claim 1, wherein the diffractive pigment does not include a reflector layer.

4. The method of claim 1, wherein the organic material is at least one material chosen from thermoplastics, thermosets, and energy curable materials.

5. The method of claim 1, wherein the low refractive index layer is a composition including low refractive index organic materials.

6. The method of claim 1, wherein the low refractive index layer is a composition including low refractive index inorganic nanoparticles.

7. The method of claim 1, wherein the at least one layer of the stack that is embossed includes a pattern chosen from sinusoidal, triangular, square, blazed, ruled gratings in a linear, cross, hexagonal, circular configuration, or any combination of them.

8. The method of claim 1, further comprising, depositing the alternating layers on a substrate including a release layer.

9. The method of claim 8, further comprising, embossing the substrate and the release layer at the same time as embossing an alternating layer of the stack.

10. The method of claim 1, wherein embossing includes partially embossing one or more of the alternating layers.

11. The method of claim 1, wherein the embossing is done prior to a full curing of the at least one alternating layers.

12. A method of making a diffractive pigment, comprising:
   depositing alternating layers of a high refractive index layer and a low refractive index layer to form a stack, wherein one or more layers of the stack are deposited using a liquid coating process; and
   embossing at least one of the one or more layers of the stack deposited using the liquid coating process, wherein the embossing is done prior to a full curing of the at least one layer of the stack; wherein the high refractive index layer is a composition including an organic material and high refractive index inorganic nanoparticles; wherein at least one surface of at least one layer is non-embossed; and wherein the high refractive index inorganic nanoparticles have a value of refractive index (n), where n>1.65 at wavelength of 550 nm.

13. The method of claim 12, wherein the pigment is transparent or semi-transparent.

14. The method of claim 12, wherein the diffractive pigment does not include a reflector layer.

15. The method of claim 12, wherein the embossing includes partially embossing at least one layer of the stack.

16. The method of claim 12, wherein a portion of the alternating layers has a frequency different from another portion of the alternating layers.

17. The method of claim 12, wherein a portion of the alternating layers have a same frequency but a different modulation.

18. A method of making a diffractive pigment, comprising:
- depositing alternating layers of a high refractive index layer and a low refractive index layer to form a stack, wherein one or more layers of the stack are deposited using a liquid coating process;
- embossing at least one of the one or more layers of the stack deposited using the liquid coating process to form an embossed surface, wherein the embossing is done prior to a full curing of the at least one layer of the stack; and
- depositing at least one additional layer to the embossed surface, wherein the at least one additional layer conforms to the embossed surface;
- wherein the high refractive index layer is a composition including an organic material and high refractive index inorganic nanoparticles; wherein at least one surface of at least one layer is non-embossed, and wherein the high refractive index inorganic nanoparticles have a value of refractive index (n), where n>1.65 at wavelength of 550 nm.

19. The method of claim 18, wherein the pigment is transparent or semi-transparent.

20. The method of claim 18, wherein the diffractive pigment does not include a reflector layer.

* * * * *